2 Sheets—Sheet 1.

J. B. THIES.

AUTOGRAPHIC REGISTERING APPARATUS.

No. 11,235. Reissued Apr. 26, 1892.

Attest
Robert J. Grindell
George Hudman

Inventor
John B. Thies
by Arthur Steen Atty

J. B. THIES.

AUTOGRAPHIC REGISTERING APPARATUS.

No. 11,235. Reissued Apr. 26, 1892.

Attest
Robert J. Grindell
George H. Graves

Inventor
John B. Thies
by Arthur Steer
Atty

UNITED STATES PATENT OFFICE.

JOHN B. THIES, OF DAYTON, OHIO.

AUTOGRAPHIC REGISTERING APPARATUS.

SPECIFICATION forming part of Reissued Letters Patent No. 11,235, dated April 26, 1892.

Original No. 410,616, dated September 10, 1889. Application for reissue filed February 4, 1890. Serial No. 338,922.

*To all whom it may concern:*

Be it known that I, JOHN B. THIES, a citizen of the United States, residing at Dayton, in the county of Montgomery and State of Ohio, have invented certain new and useful Improvements in Autographic Registering Apparatus; and I do hereby declare that the following is a full, clear, and exact description of the invention, which will enable others skilled in the art to which it appertains to make and use the same, reference being had to the accompanying drawings, and to the letters and figures of reference marked thereon, which form a part of this specification.

My invention relates to improvements in autographic registering apparatus, the several features of which will be fully hereinafter set forth.

The object is to preserve detachable copies of any instrument of writing sought to be preserved, and the accomplishment of this object is effected by the mechanism illustrated in the accompanying drawings, comprising two sheets, in which—

Figure 1:
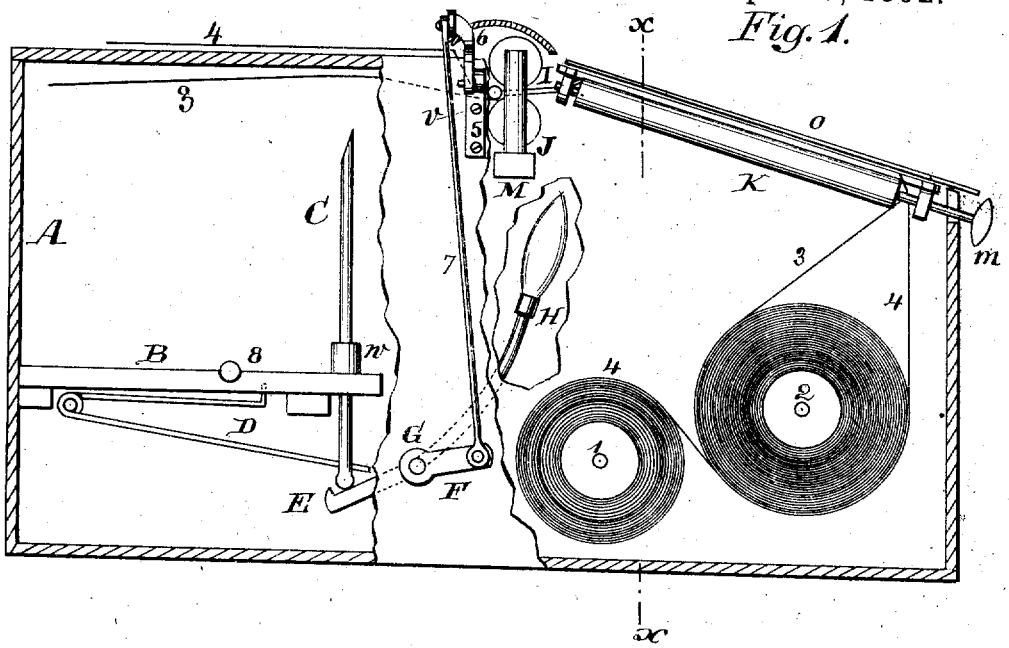
Figure 2:
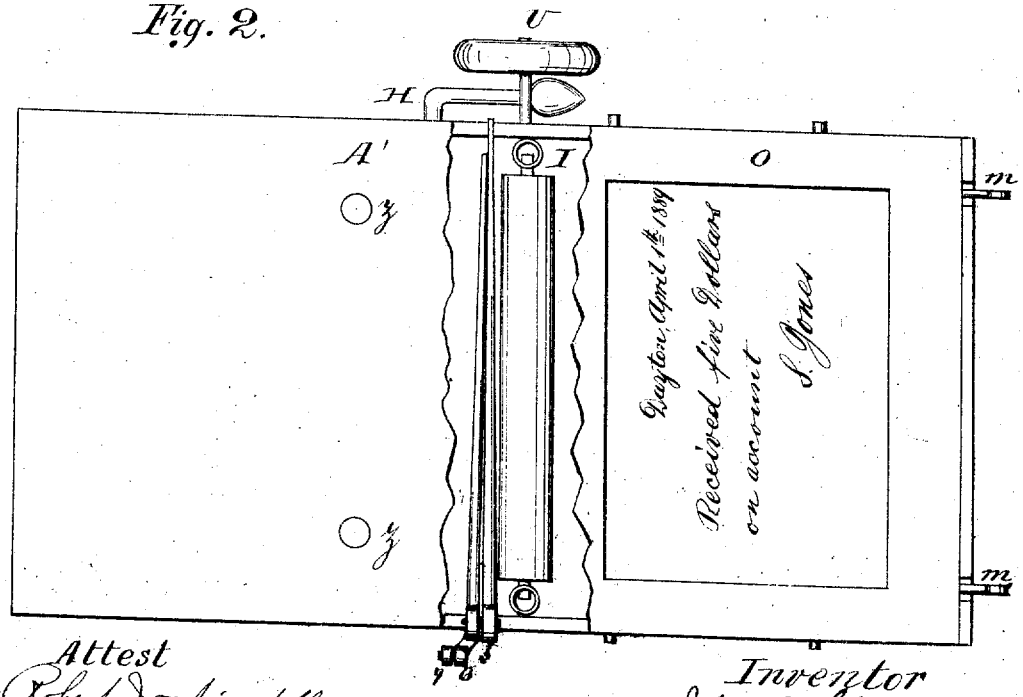
Figure 3:
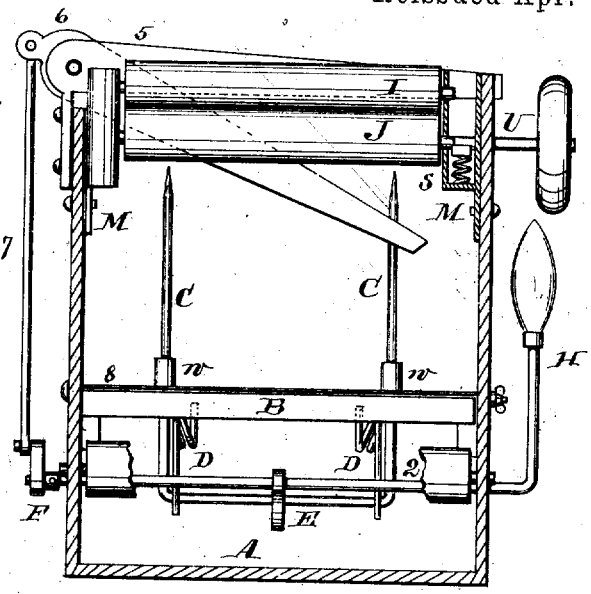
Figure 4:
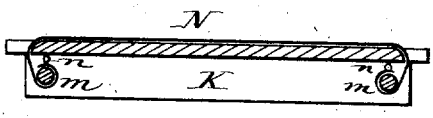
Figure 5:
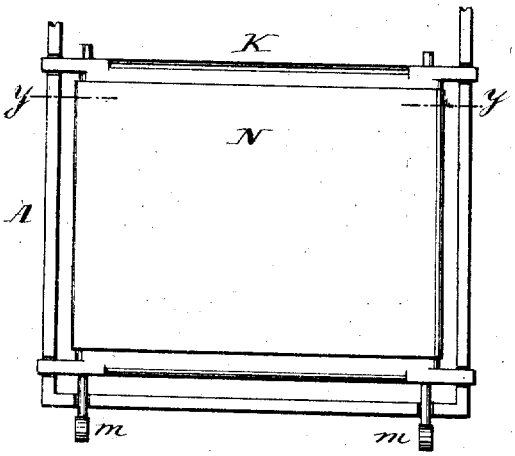

Figure 1 is a fragmentary side elevation of the apparatus. Fig. 2 is a top view of the same with a part of the top cut away and other parts omitted. Fig. 3 is a transverse section on line *x*, Fig. 1. Fig. 4 is a transverse section of the tablet-frame on line *y*, Fig. 5. Fig. 5 is a top view of the tablet-frame with the transfer-paper attached.

Like letters and figures designate like parts throughout the several views.

A is the frame. The rear part to the left of the center is closed by a lid, which may be attached by hinges or be held in grooves of the said frame, and when desirable may be secured by a lock. On the front end is held the tablet-frame K in an inclined position. Spools 1 and 2 are supported in bearings in the sides of the frame, and on said spools are respectively strips of paper 3 and 4.

At Fig. 5 the tablet-frame K is shown as being supported in notches of the frame. This tablet-frame consists of a plane upper surface rounded at the ends, projections to engage the frame, and flanges at the ends to support the two rollers *m m*, on which are rolled the ends of the transfer-paper N, Figs. 4 and 5.

M M are bearings for the gripping-rollers I and J, and are attached to the sides of the frame. The upper parts are hollow for the purpose of receiving spiral springs *s*, which press the lower roller against the upper. One of these bearings is shown in section at M, Fig. 3. The roller I has a hard surface of wood or metal, and the roller J is covered with rubber, and to the shaft of the latter is attached the hand-wheel U for the purpose of rotating the rollers.

The paper strip 4 passes beneath the roll or strip 3, and thereby produces sufficient friction to keep both strips taut. The former strip, from the roll of the latter, passes over the transfer-paper between the gripping-rollers and through an orifice in the housing over said rollers; but in passing from the rollers to the said orifice it passes beneath the edge of the blade 5 of the shears. The strip 3 passes up and beneath the transfer-paper between the rolls and is separated from the top strip by the rod *v* and likewise passes under the edge of the fixed blade of the shears, and both ends are separated by the operation of the shears.

On the frame over the tablet-frame is attached the open plate or window O, and within this space the writing is done, as indicated at Fig. 2.

The blade 5 of the shears is fixedly attached to the side of the frame and extends across the top of the same. To this blade is riveted, as usual, the blade 6, whose end is pivotally connected to the crank F on the shaft G, and by this means the requisite movement is given to operate the shears. This shaft has bearings in the sides of the frame. Central on the shaft is the arm E, and external to the frame is attached the operating-lever H. The relation of these parts is best shown at Fig. 3.

On cleats attached to the sides of the frame is placed the block B, and over this block, in a groove on its face, is the bolt 8, which passes through the sides of the frame, and thereby holds said block against the upward pressure of the springs D, attached to the under side of the same. The free ends of this pair of springs rest on the transverse part of the angular filing-pin C. This filing-pin has points bent at a right angle to the shaft and is held in orifices of the thimbles *w*, held in the block B. When the handle H is drawn forward, the filing pin penetrates the paper slip 3, entering the holes *z z* of the top, and at the same instant the shears sever both slips of paper. When the handle is carried back, the filing-pin drops down, carrying with it the perforated slip. When a large number of slips have accumulated in the box, the bolt 8 is withdrawn, and the block B raised out of the frame or case and the slips removed for a proper filing. When the two strips of paper are placed as heretofore described, the turning of the hand-wheel U carries the two sheets forward and they are disposed of as described. The writing being done on the external sheet, the transfer-paper gives a fac-simile impression on the inner sheet.

From the prior description the operation is sufficiently apparent, and it is only necessary to add that the transfer-paper is changed in position on the tablet-frame as it becomes necessary to secure distinctness of impression by the rollers *m m*, of the tablet-frame.

Having thus fully described my invention, what I claim, and desire to secure by Letters Patent, is—

1. In an autographic register, paper-dispensing rolls, writing-tablet, and mechanism for propelling the paper over said tablet, in combination with cutting-knives and means for giving a shearing cut for severing the paper from the rolls, substantially as described.

2. In an autographic register, paper-dispensing rolls, writing-tablet, and mechanism for propelling the paper over said tablet, in combination with a cutting-shears for severing said paper and means for operating the same independently of the propelling mechanism, substantially as described.

3. The combination, in an autographic register, of paper-dispensing rolls, feeding mechanism to unwind said paper, cutting appliances to sever the same from the rolls, and filing-pins upon which duplicate sheets may be filed, substantially as described.

4. The combination, in an autographic register, of paper-dispensing rolls, feeding mechanism to unwind said paper, cutting appliances to sever the same from the rolls, and filing-pin upon which duplicate sheets may be filed, the cutting appliance and filing-pin being operated independently of the propelling mechanism.

5. In an autographic register, the combination, with paper-dispensing rolls, of writing-tablet and transfer-paper, feeding-rollers by which the paper is drawn out, cutting-knife for severing the same, and filing-pins upon which the duplicate sheets are filed, substantially as shown and described.

6. In an autographic register, the combination, with a series of paper-dispensing rolls and gripping-rollers through which said paper is fed, of a cutting-knife operated by a hand-lever affixed to a shaft, and filing-pins upon which to file the duplicate sheet raised by an arm on said shaft, so that the sheets are cut and filed away at one operation, substantially as described.

7. In an autographic register, the combination of the frame, paper-dispensing rolls journaled therein, writing-tablet to support the strips drawn therefrom with intermediate transfer-paper, feeding-rollers through which said strips are drawn, and cutting mechanism for severing said sheets, with lever and connecting-rod to operate the same, substantially as described.

8. In an autographic register, the combination, with the frame, of a shaft journaled therein, arm affixed thereto, filing-pins carried upward by said arm to pierce the paper to be filed, movable cutting-knife, and fixed cutting-edge against which said knife acts, said knife being operated simultaneously with the filing-pins to sever the sheets of paper and fix the under sheet on said pins, substantially as described.

9. In an autographic registering apparatus, the combination of the frame A, shaft G, arm E, filing-pin C, carried upwardly by said arm to pierce the under strip of paper as it is thrust against the top of said frame and pierced by the filing-pin points entering orifices *z z* of said top, the crank F, connection-rod 7, the moving blade 6, and fixed blade 5, and the operating-handle H, these parts to simultaneously sever the two strips of paper and fix the under strip on the said filing-pin, substantially as described.

10. In an autographic register in which a writing-tablet and a number of strips of paper are employed, the combination of the frame A, the shaft G, with the operating-handle H attached, crank F, connection-rod 7, and shears of parts 5 and 6, the latter being operated by the movement of the shaft and the paper fed to the shears by rollers, substantially as described.

JOHN B. THIES.

Witnesses:

ALFRED M. ALLEN,
W. H. RUSSELL.